(12) United States Patent
Eddy et al.

(10) Patent No.: US 6,899,532 B2
(45) Date of Patent: May 31, 2005

(54) LIQUID-TIGHT ELECTRICAL ENTRY SYSTEM WITH INTEGRAL GROUND TAB, PARTICULAR TO SUBMERSIBLE PUMPS

(75) Inventors: Shane Belmont Eddy, Seneca Falls, NY (US); Steven Zoltan Muzslay, Huntington Beach, CA (US); Ronald L. Martin, Seneca Falls, NY (US); Mark Anthony Augustyniak, Remulas, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 409 days.

(21) Appl. No.: 10/117,790

(22) Filed: Apr. 5, 2002

(65) Prior Publication Data

US 2003/0190243 A1 Oct. 9, 2003

(51) Int. Cl.[7] .................. F04B 35/04; H01R 13/648
(52) U.S. Cl. .................. 417/410.1; 417/423.1; 417/423.3; 310/71; 439/95; 439/101; 439/108
(58) Field of Search .................. 417/410.1, 423.1, 417/423.3, 40; 310/71, 89; 439/95, 98, 101, 108

(56) References Cited

U.S. PATENT DOCUMENTS

| | | | | |
|---|---|---|---|---|
| 3,952,218 A | * | 4/1976 | Deters | 310/71 |
| 5,100,343 A | * | 3/1992 | Peterson | 439/505 |
| 5,490,789 A | * | 2/1996 | Simons | 439/101 |
| 5,801,465 A | * | 9/1998 | Yamada | 310/71 |
| 6,439,899 B1 | * | 8/2002 | Muzslay et al. | 439/98 |

* cited by examiner

*Primary Examiner*—Charles Freay
(74) *Attorney, Agent, or Firm*—Duane Morris LLP

(57) ABSTRACT

An electrical cord entry system for a submersible pump. The cord entry system includes a receptacle assembly for providing unimpeded transmission of electrical power and/or electrical signals through a pump housing of the pump, and a connector assembly for interfacing with the receptacle assembly. The receptacle assembly includes a ground tab for engaging the pump housing to electrically ground the pump housing.

24 Claims, 15 Drawing Sheets

LIQUID-TIGHT ELECTRICAL ENTRY SYSTEM WITH INTEGRAL GROUND TAB, PARTICULAR TO SUBMERSIBLE PUMPS

FIELD OF THE INVENTION

The present invention relates to electrical cord entry systems, and more particularly, to a liquid-tight electrical cord entry system with integral electrical grounding means for submersible pumps.

BACKGROUND OF THE INVENTION

There are many different types of submersible pumps including for example, sump, effluent, and sewage pumps, that have internal electric motors housed in or near the pumpage. Such pumps must often incorporate several key features that enable them to function safely in harsh environments. These key features include but are not limited to: an isolated motor chamber to house the electric pump motor and other electrical devices; a liquid tight cord entry for electrical power access into an isolated motor chamber; an electrical grounding feature; and accessories that can include liquid level controls, seal sensors, and alarms.

Submersible pumps must be designed with features that provide adequate protection to electrical devices housed in or near the pumpage. One such feature is the motor housing, which typically is made of a metal, preferably cast iron, that affords protection from impact, abrasion, and pumpage infiltration.

When the motor housing is attached to mating components like a seal housing or a motor adapter, an isolated area within the submersible pump assembly is formed. This isolated area is called "the motor chamber" and is an area where the electric pump motor and related electrical components are located isolated from the pumpage.

One method for providing further protection to the electrical components is to have the motor chamber filled, in whole or in part, with an electrically inert liquid, often referred to as "turbine oil". Turbine oil is mainly used for heat dissipation, bearing lubrication, and emulsification of pumpage infiltration. Emulsification is known by those skilled in the pump art to extend a pump's operating life by delaying potential short circuiting should a seal failure occur and inadvertently allow electrically conductive liquids into the motor chamber.

In order to effectively operate a submersible pump in or near the pumpage, liquid tight access for the passage of electric power and accessory cables entering into the isolated motor chamber of the pump must be provided. A typical cord entry has two functions: 1) securing the cable or cordage from excessive movement that could cause damage; and 2) preventing the flow of liquids in and around electrical components and motor bearings. There are two types of cord entries commonly used on submersible pumps that provide these functions. They are a "cord grip" and a "detachable cordset".

FIG. 1 shows a cord grip 10, which is a type of cord entry that seals or isolates the external pumpage from entering the motor chamber of a pump by incorporating a grouping of pliable packing material 11, a metal washer 12, a gland housing 13, and a gland nut 14. The gland housing 13 is typically integrated into the motor housing (not shown) or attached by mechanical means using one or more of the following methods: a tapered pipefitting 15, fasteners 16, and an O-ring 17, gasket and/or epoxy. When properly assembled, the gland housing 13 controls the forces exerted by the gland nut 14 onto the pliable packing material 11, and in particular, to exert enough force to cause the packing material 11 to flow and crush against a power-cord jacket 18, thereby creating a water tight seal. Because of the forces imparted onto the power-cord jacket 18, a certain amount of cord anti-slippage or pullout resistance is offered, hence the name "cord grip".

FIG. 2 shows a detachable cordset 20, which is a type of cord entry having a power cord that is detachable from the pump to improve serviceability. A typical detachable cordset consists of a receptacle, an over-molded plug, a washer, and a compression nut. The receptacle portion of the detachable cordset is typically configured to have one half of a mating set of pins that interface with the over-molded plug, which has either a corresponding engaging or receiving set of mating pin connections. The over-molded plug portion of the detachable cordset is typically molded from a compressible electrically insulating material that works similar to the packing gland of the cord grip by compressing and sealing around the conductors when pressure is applied by a gland nut of the detachable cordset. The receptacle housing of the detachable cordset is either integrated into the pump's motor housing or mechanically attached by some sealable means e.g., pipe fittings, fasteners, o-rings, gaskets, and/or epoxies.

Referring to FIG. 3, safety agency protocol requires that whenever electrically conductive material is used to enclose potentially live electric components, an electrical grounding feature including for example, a ground lead 30, ground ring terminal 31, and ground screw 32 arrangement, must be incorporated to avoid the possibility of electric shock. Because submersible pumps typically have metal motor housings to enclose the motor windings, such an electrical grounding feature is used. In most cases, the motor housing 33 will be drilled and tapped in order to receive the ground screw 32, which will be used to affix the ground ring terminal 31 attached to the ground lead 30 to the motor housing 33.

Typical submersible pump accessories may include liquid level control devices, alarms, and seal sensors. These accessories are typically critical to product performance and various pump functions like liquid transfer, liquid level monitoring, and product maintenance monitoring.

A liquid level control device is typically be used for the liquid level control of the pumpage. This device is usually mounted external to the pump but may have a power cord that passes through a cord entry (like the earlier described cord grip) and into the motor housing where the appropriate electrical connections are made within the motor chamber and isolated from the pumpage. Another common method of energizing this device is to use a separate power cable that runs tandem to the pump power cord and is terminated with a special type of plug end called a NEMA-5P piggyback plug. Once plugged into a power outlet, the piggyback plug will only allow power to be transmitted to the pump when activated by a switching device.

Similarly, a typical pump alarm may have electrical connections internal to the motor chamber or those that run tandem to the pumps' powercord. The alarm can send a signal to any number of devices to notify people of a particular function detected, weather it be a high liquid level setting off a bell or siren, or in some cases sending a message via a telephone to a service center or municipality.

Additionally, a seal sensor is commonly used in the pump art to detect a possible mechanical shaft seal or other type of failure by sensing a heightened level of moisture emulsified within the turbine oil. Persons of ordinary skill in the art will appreciate that if this condition is left unchecked, the moisture can have a detrimental effect upon the components located within the isolated motor chamber, i.e., the electric pump motor and motor bearings.

Submersible pumps with electrical devices mounted in or near the pumpage have shortcomings associated with: 1) maintaining an isolated motor chamber; 2) cord entries and "oil wicking"; 3) electrical grounding features; and 4) energizing accessories like liquid level control devices.

Isolating the electrical components of a typical submersible pump has always been a challenge for the pump industry. As previously mentioned, key features used to provide adequate protection to the electricals are the metal motor housing and the insulating turbine oil. Because of the need to bring powercords and accessory control cords into the isolated area of the motor chamber, access ports must be created in the motor housing. As with any gasketed, sealed and fitted joint, the access port created in the motor housing is at risk of being a potential leak path for gas or liquid infiltrating into or out of the isolated motor chamber.

In a typical submersible pump as shown in FIG. 4, multiple access ports 40 are commonly used to bring in the earlier described power cords, seal sensors and externally mounted liquid level control devices. These multiple access ports increase the risk of additional leak paths, which jeopardizes the integrity of the isolated motor chamber, and consequently, the pump. Multiple access ports also require costly machining operations, such as drilling, boring, milling, tapping, and costly joining techniques, such as bonding, in order to seal a typical cord entry.

With a typical submersible pump having cord entries exposed to the pumpage, it is extremely important that an integral seal be formed between the access port of the motor housing and the particular cord entry used to secure the power/accessory cord to the pump. The earlier described cord grip can offer adequate sealing between the motor housing and the outer jacket of a powercord passing through it, unfortunately, cord grips cannot block or prevent the flow of liquid internal to the powercord.

One of the undesirable consequence of using turbine oil in a submersible pump is the oil "wicking" effect. Because turbine oil has such a low viscosity, it tends to seep or wick-up into the individual strandings of the electrical conductors of the electric power cord due to capillary action. If left unchecked the capillary action could cause turbine oil to seep-out from the motor chamber.

As shown in FIG. 5, oil wicking is typically addressed in the prior art by potting the power cord. Power cord potting typically consists of a complex process that involves stripping away a small portion of each of the conductor's insulative jacketing and applying an epoxy 51 to the exposed conductors 50, which must be fully cured to prevent turbine oil wicking. It is common to have cure times up to 48 hours. This power cored potting process undesirably increases the cost of the power cord.

Another disadvantage associated with cord grips stems from the loss of sealing integrity that can occur from the relaxation of the compressed packing gland material. When a cord grip gland nut is torqued to a specified value, the compressed gland material, often butadiene rubber, relaxes and flows over time into the voids around the jacketed power cord. This causes both the power cord and gland nut to loosen, which may lead to failure if not corrected. Although, re-torqueing the gland nut after a designated time period will correct this problem, to do so requires additional handling which is undesirably costly, and delays packaging and shipping of the pump.

The earlier mentioned electrical ground feature adds further to the expense of the pump. Specifically, electrical grounding is typically accomplished via a grounding ring terminal connected to the ground lead of the incoming power cord that is mechanically fastened to the motor housing with a ground screw. The separate ground screw and lead, and the drilling and tapping that must be performed in the motor housing in order to implement the electrical ground feature, add to the expense of the pump. Another disadvantage associated with the electrical ground feature is that the ground wire can be pinched or damaged during the assembly process.

Economic disadvantages have been observed with variations in the configuration of the exterior mounted liquid level control that is commonly used on submersible pumps. The first disadvantage concerns the use of the separated powercord that follows tandem to the main pump powercord (often 10 ft. long) and terminates with a special plug called a NEMA-5P piggyback plug. The second disadvantage concerns the use of the short powercord emerging from within the pump's motor housing with termination located in the isolated motor chamber. This is perceived to be a disadvantage because of the difficulty and expense associated with its assembly.

An additional disadvantage associated with electrical connections originating within the motor chamber lies with the difficulty of servicing or replacing the electrical connections. Service or replacement of the electrical connections cannot be accomplished without draining the turbine oil and disassembling the pump.

SUMMARY OF THE INVENTION

The present invention is an electrical cord entry system for a submersible pump. The cord entry system comprises a receptacle assembly for providing unimpeded transmission of electrical power and/or electrical signals through a pump housing of the pump. The receptacle assembly includes a ground tab for engaging the pump housing to electrically ground the pump housing.

The cord entry system may also comprise a connector assembly for interfacing with the receptacle assembly. The connector assembly supplies the electrical power and/or electrical signals.

The connector assembly may include a splicing member and a single electrical cable coupled to the splicing member. The splicing member includes a first portion that couples to the cable with the receptacle assembly and a second portion that diverts a portion of the electrical power supplied through the cable to a pumpage level control device associated with the pump.

A locking arrangement may be provided for holding and retaining the connector assembly to the receptacle assembly. The locking arrangement may include a cam groove and locking detent associated with the receptacle assembly and a coupling ring associated with the connector assembly.

The receptacle assembly may also include a plurality of electrically isolated electrical contacts. The electrical contacts may have a pin structure with a stepped configuration and may be formed of brass. The contacts may be pressed fitted into the holes of a receptacle housing of the receptacle assembly thereby creating a liquid tight seal.

The contacts may be used for electrical power transmission, electrically grounding the pump housing, and other devices associated with the pump.

The receptacle housing may have a liquid sealing member that sealingly engages an entry port of the pump housing for preventing pumpage infiltration about the receptacle housing into the pump housing.

DETAILED DESCRIPTION OF THE INVENTION

The present invention is a liquid-tight electrical cord entry system with integral electrical grounding means for submersible pumps. The cord entry system of the present invention addresses many of the difficulties associated with the manufacture and operation of submersible pumps having electrical components mounted in or near the pumpage, and particularly addresses the difficulties associated with redundant and complex cord entries. As will soon be apparent to those skilled in the pump art, the cord entry system of the present invention improves product reliability and versatility over currently available cord entries.

Figure 1:
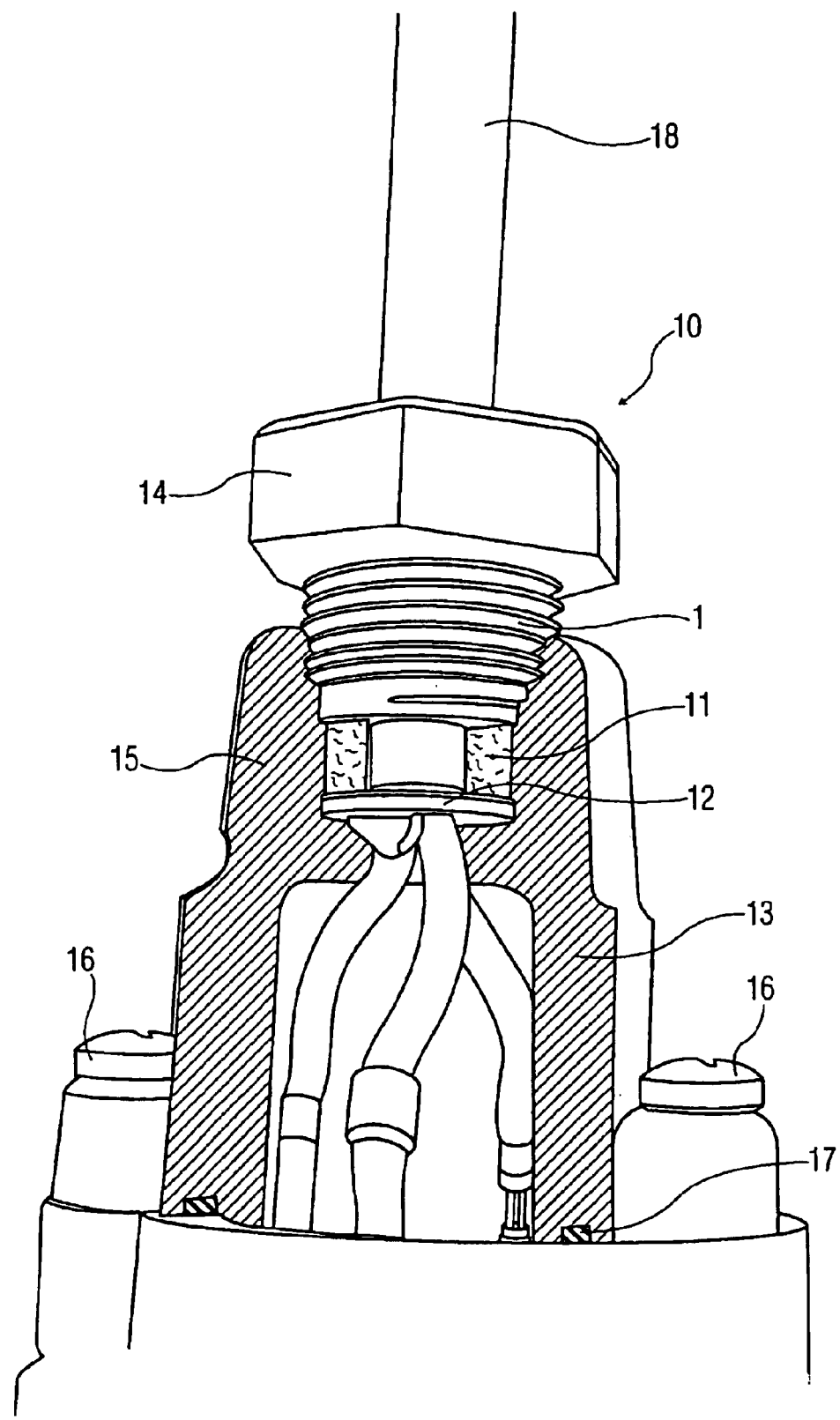
FIG. 1 is a cut away view of a submersible pump with a cord grip type of a prior art cord entry system.
Figure 2:
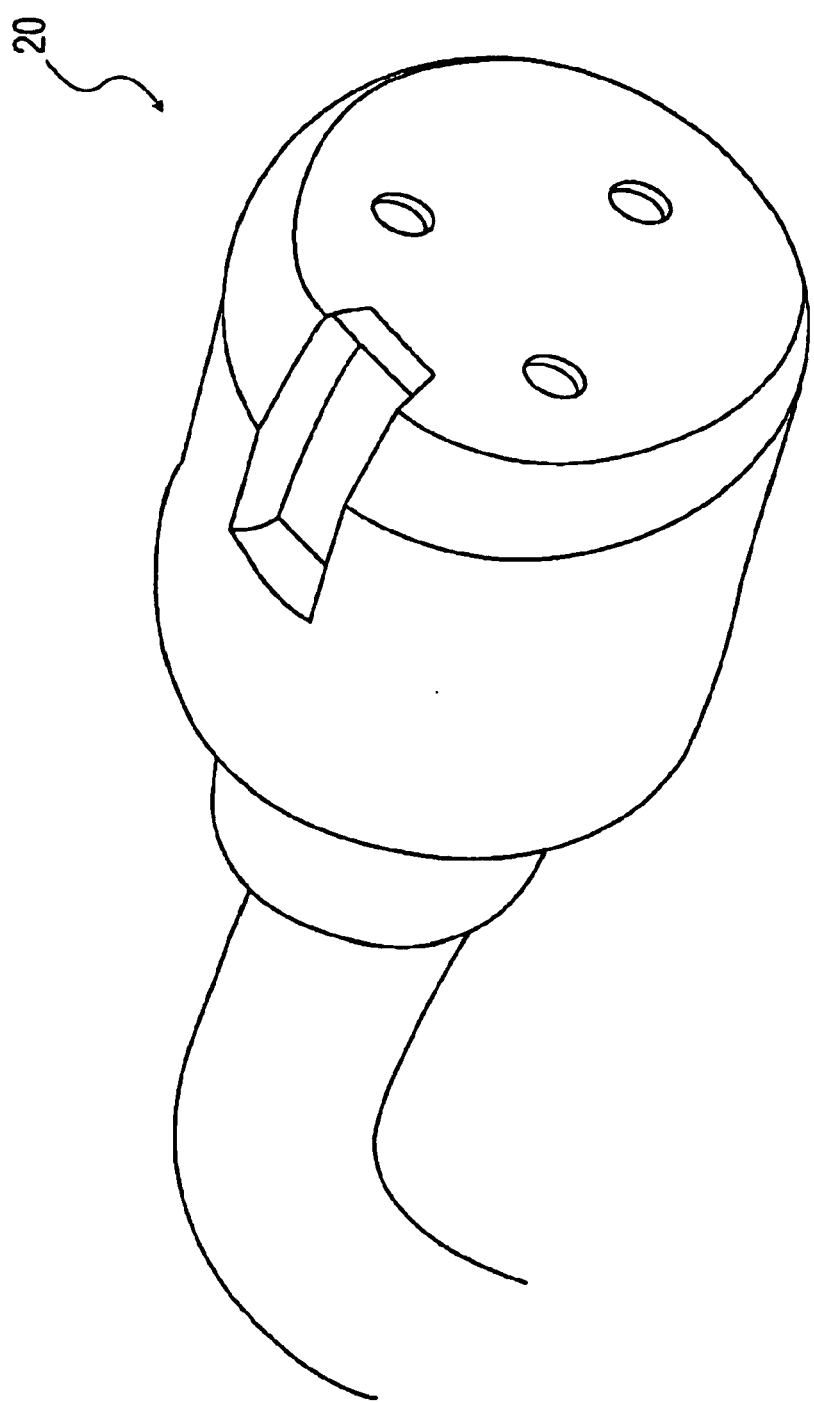
FIG. 2 is a perspective view of a detachable cordset of a prior art cord entry system.
Figure 3:
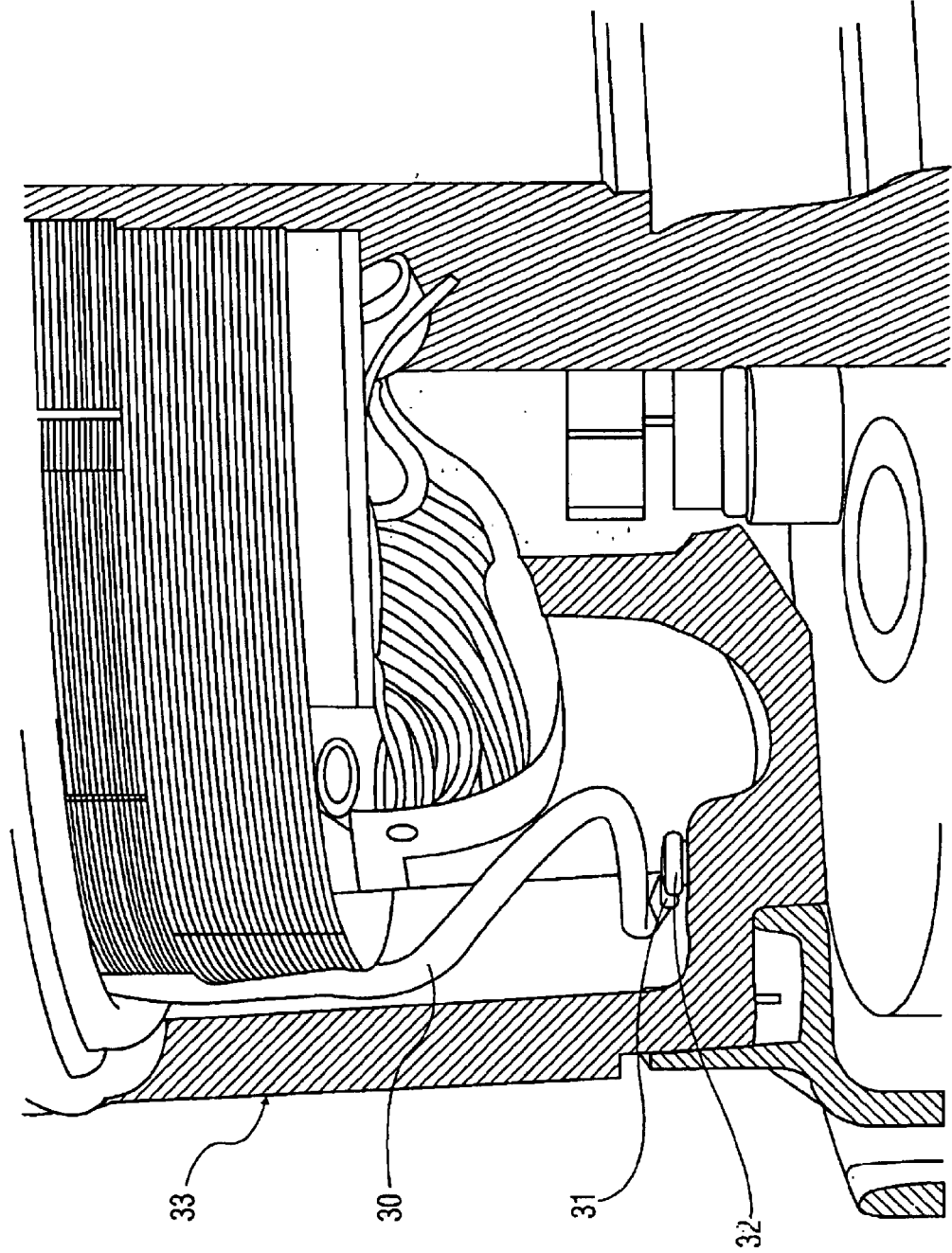
FIG. 3 is a cut away view of submersible pump with a prior art cord entry system that includes a ground lead.
Figure 4:
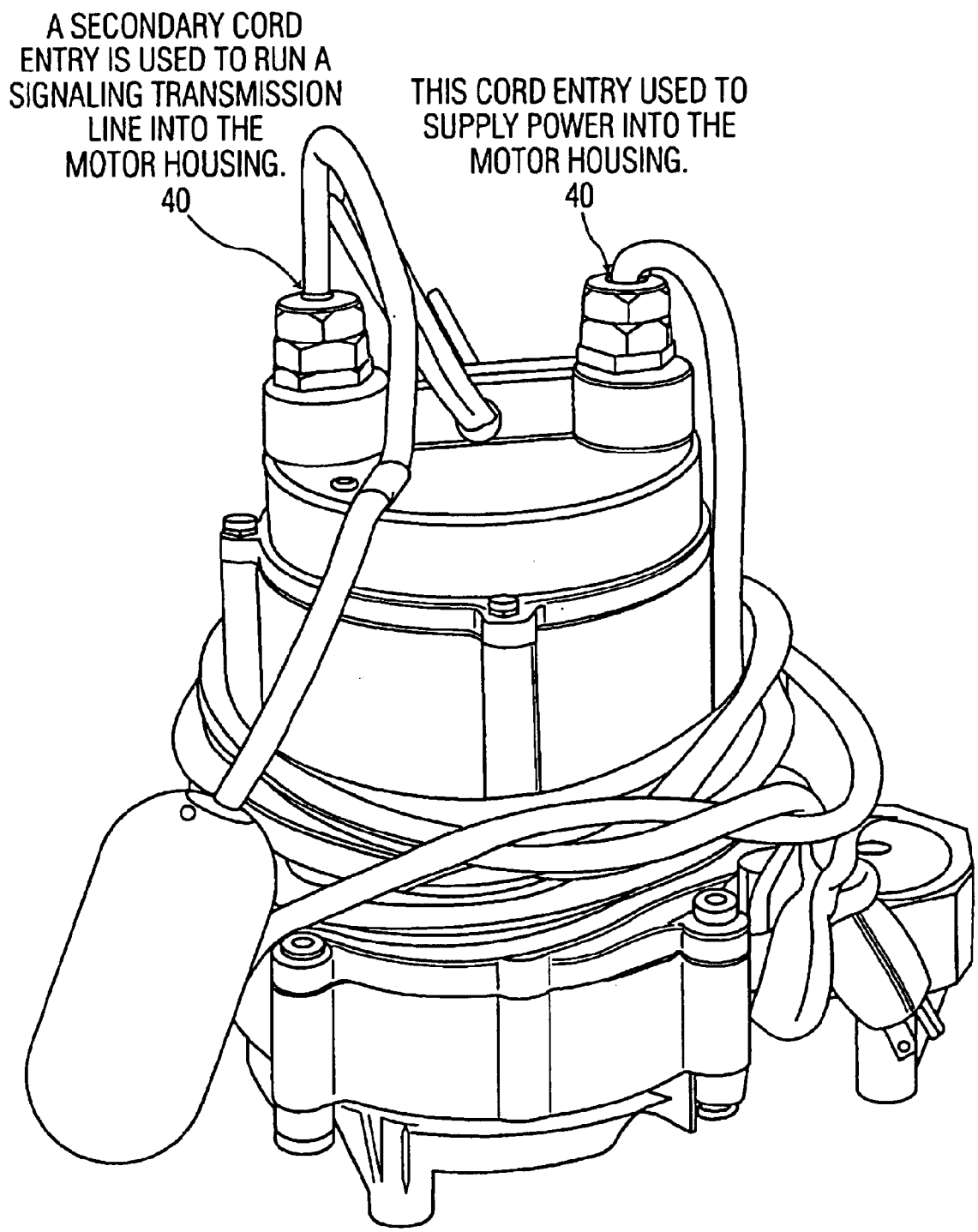
FIG. 4 is a perspective view of a submersible pump having prior art dual cord entry systems.
Figure 5:
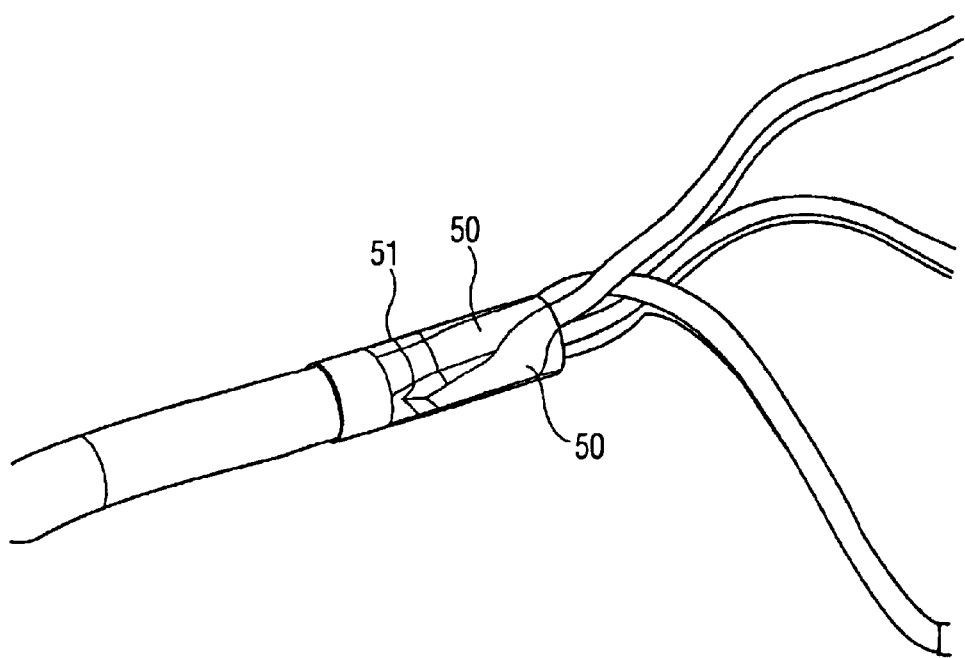
FIG. 5 is a perspective view of a power cable of a prior art cord entry system that has been conventionally processed to prevent oil wicking.
Figure 6A:
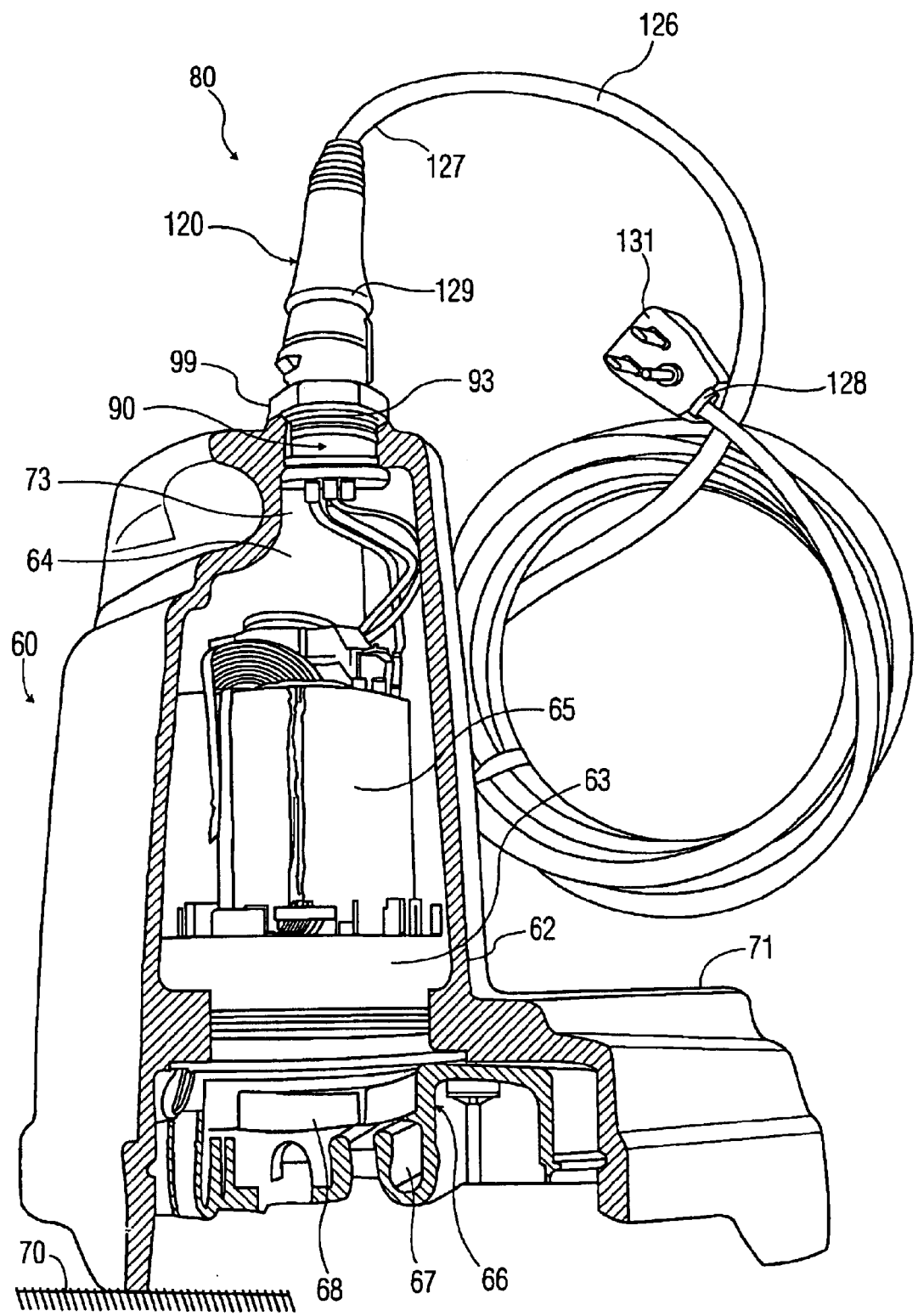
FIG. 6A is a cut away view of an exemplary submersible pump that utilizes a liquid-tight electrical cord entry system with integral electrical grounding means made according to the present invention.

FIG. 6A shows an exemplary submersible pump 60 that utilizes a liquid-tight electrical cord entry system 80 with integral electrical grounding means made according to the present invention. The submersible pump 60 is of the type having electrical components mounted in or near the pumpage for servicing liquid transfer application including sump, effluent, and sewage applications.

Figure 6B:
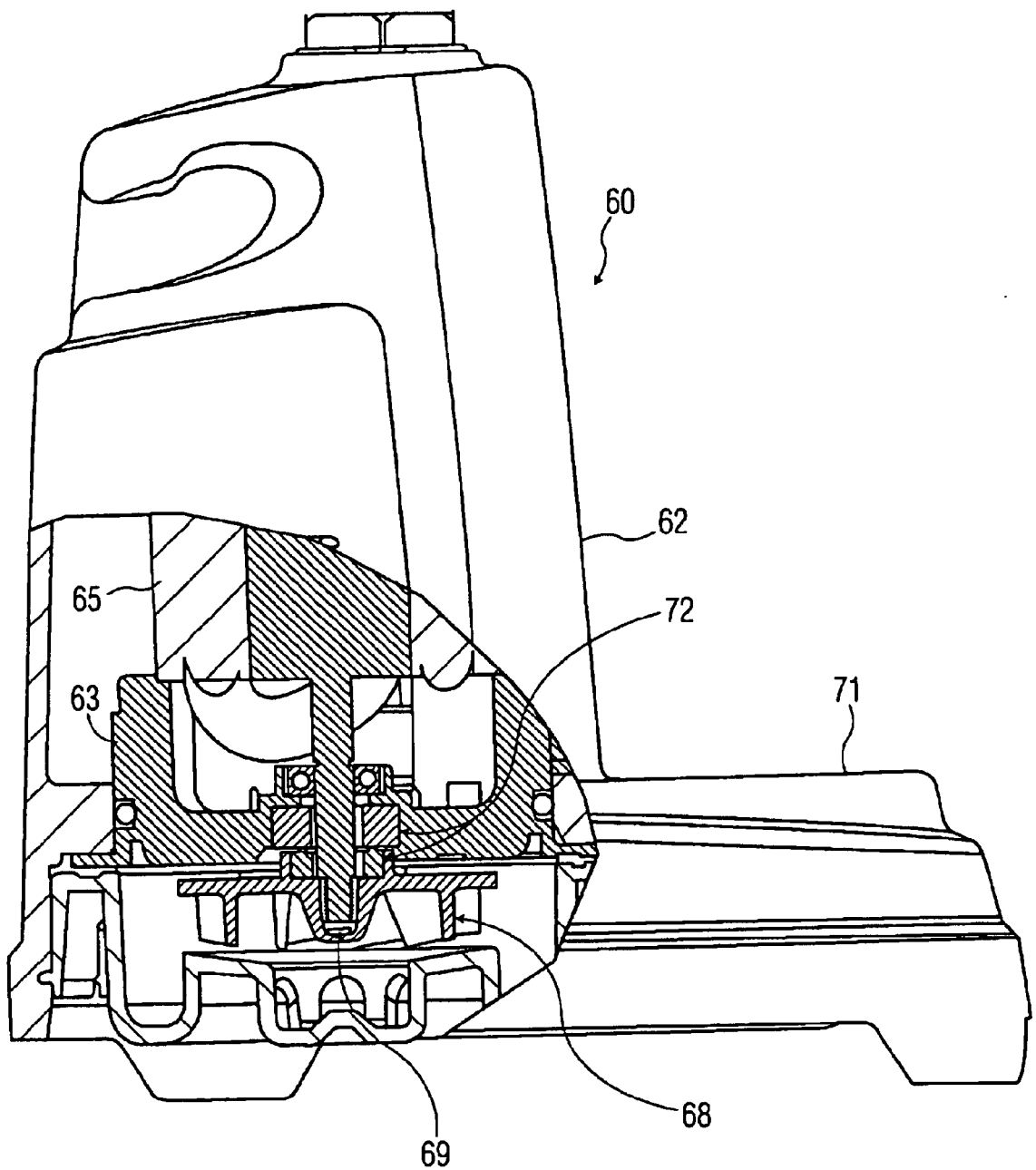
FIG. 6B is a partial sectional view of the submersible pump of FIG. 6A.

The pump 60 includes a motor adaptor 63 and a motor housing 62 sealingly attached to the motor adaptor 63. The motor adaptor 63 and the motor housing 62 form an isolated motor chamber 64 that houses an electric pump motor 65 fixedly mounted on top of the motor adaptor 63, and other related components. The sealed motor chamber 64 protects the electric pump motor 65 and the other related components from the harsh environment of the pumpage. An impeller casing 66, located below the motor adaptor 63, is sealingly attached to a lower portion of the motor housing 62, thereby forming a pumping chamber 67. An impeller 68, located within the pumping chamber 67, is connected to the pump motor 65 by a shaft 69 such that the shaft 69, impeller 68, and motor 65 are vertically aligned (FIG. 6B). The motor housing 62 and the motor adaptor 63 are preferably constructed from suitably rigid materials that are impervious to liquids and gases, with the motor housing 62 being preferably made from cast iron, and the motor adaptor 63 preferably made from a molded thermal plastic. The pump 60 is generally located within a receiving basin or collection vessel partially shown at 70.

The pumpage (containing both liquids and solids) within the receiving basin 70 collects in the pumping chamber 67. When the motor 65 is operated, rotation of the impeller 68 causes liquid within the chamber 67 to be ejected through a discharge port 71. As shown in FIG. 6B, interfacing between the motor adaptor 63 and the shaft 69 is a mechanical shaft seal 72, which is used to maintain motor chamber isolation by preventing pumpage infiltration. In a preferred embodiment, turbine oil (not shown) is added to the motor chamber 64 to a level that will fully protect the motor 65 taking care to leave a void in the motor chamber 64 for thermal expansion of the oil. As is well known in the pump art, turbine oil is an electrically inert and highly viscose liquid that is used for but not limited to, the function of heat dissipation, bearing lubrication, and emulsification of pumpage infiltration. Emulsification is also known by those skilled in the pump art to extend a pump's operating life by delaying potential short circuiting should a seal failure occur and inadvertently allow electrically conductive liquids into the motor chamber 64.

Referring to FIGS. 6A and 6B, the liquid-tight electrical cord entry system 80 of the present invention generally comprises a connector assembly 120 and a receptacle assembly 90. This construction enables the cord entry system 80 to transmit an unimpeded supply of electrical power from an external power source, and/or signals from peripheral device (s) like those used for liquid level control, moisture sensors, alarms, impedance testing, and continuity testing, through the motor housing 62, to the motor chamber 64 to energize the pump's electric motor 65 or the other electrical devices used to control or monitor pumping activity, without jeopardizing the isolation of the motor chamber 64.

Figure 7A:
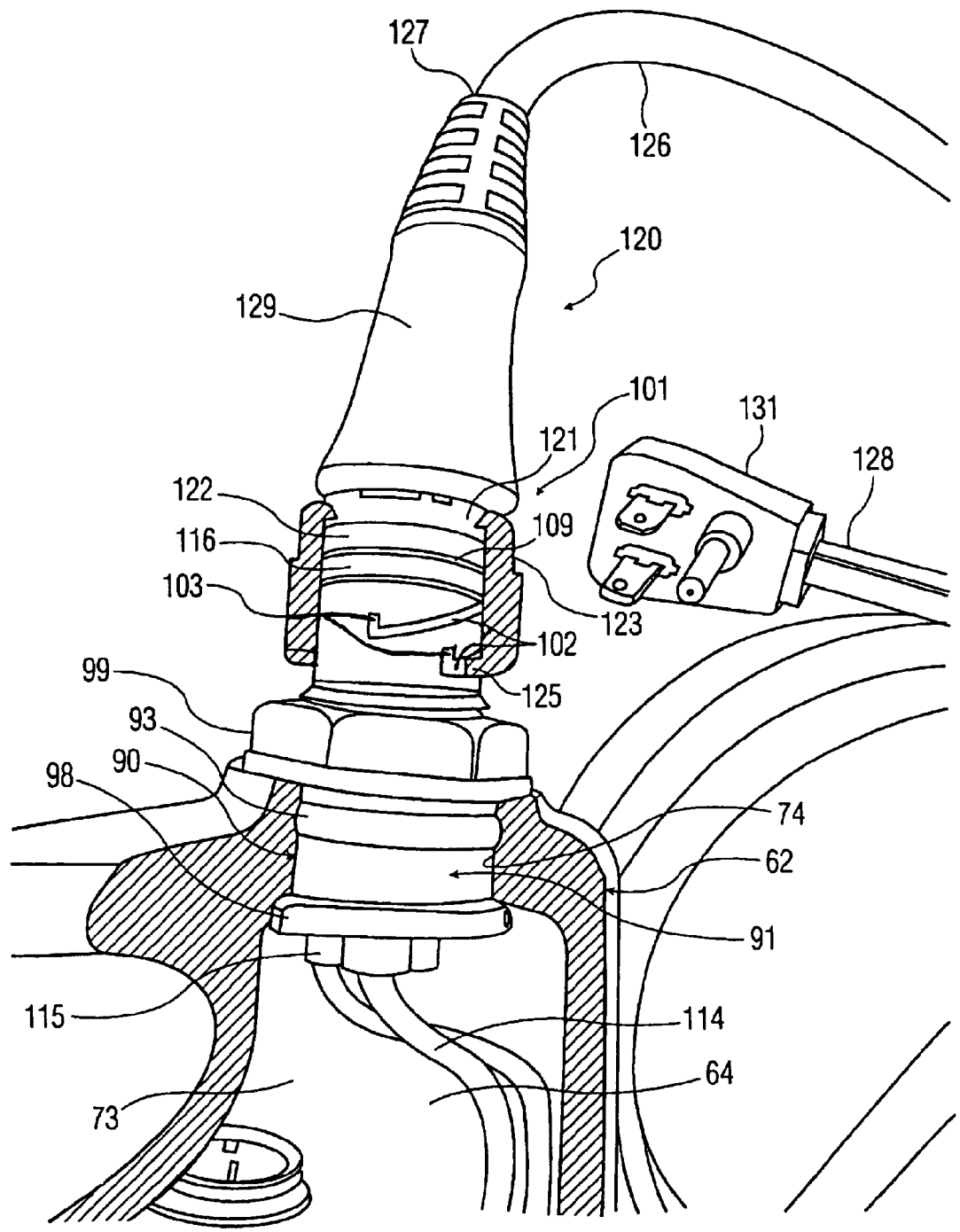
FIG. 7A is an enlarged cut away view of the submersible pump and cord entry system shown in FIGS. 6A and 6B.
Figure 7B:
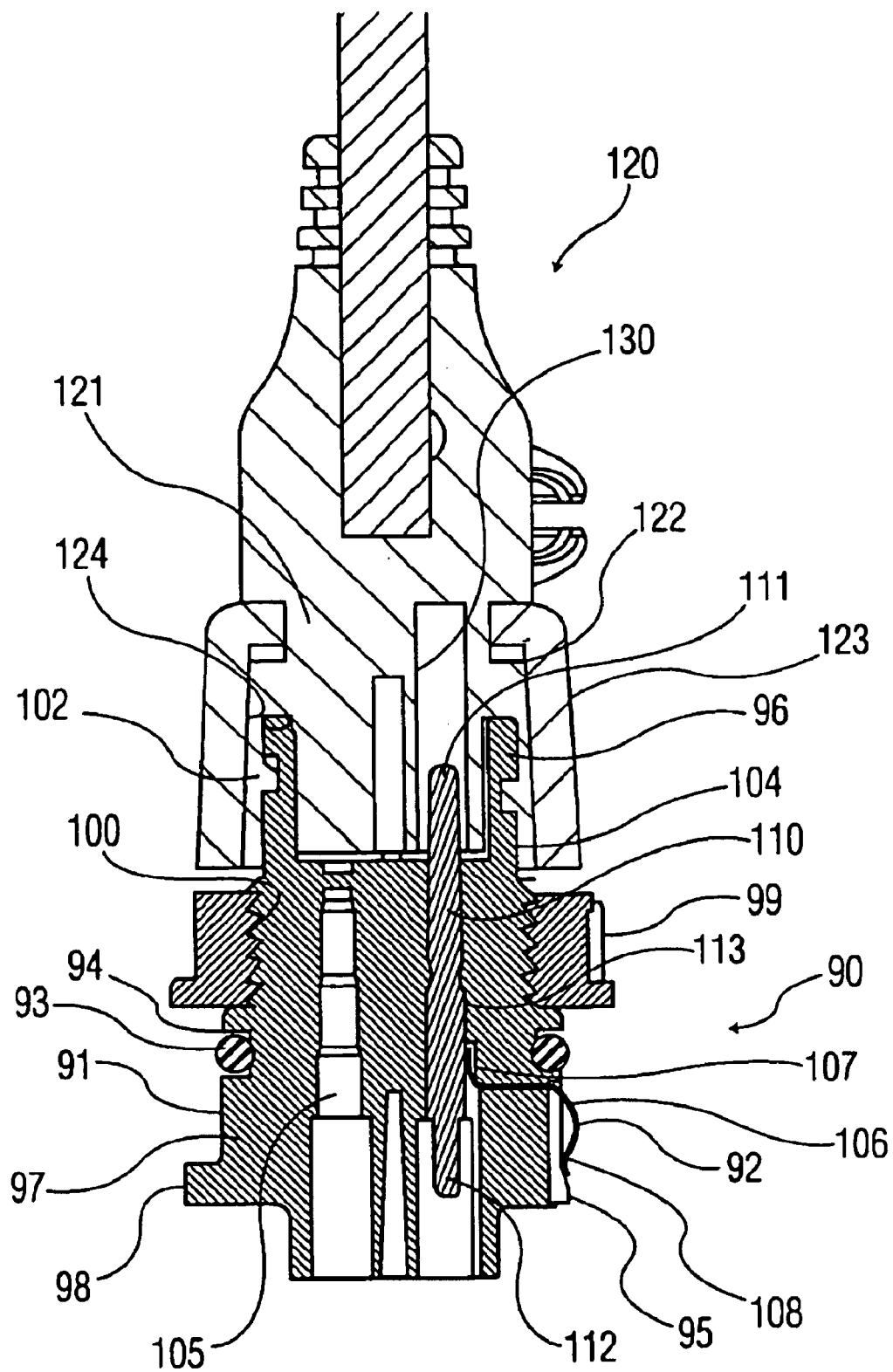
FIG. 7B is a sectional view of the cord entry system shown in FIGS. 6A and 6B.

Referring to FIGS. 7A and 7B, the receptacle assembly 90 includes a receptacle housing 91, electrical pin contacts 110 and an electrical grounding tab 92. The receptacle housing 91 includes a connector end section 96 and an opposing pump end section 97. The receptacle housing 91 is typically constructed from a suitably rigid material that is impervious to gases and liquids, and has electrical insulative properties that enable the receptacle housing 91 to withstand the electrical energy for which it will be carrying. In one preferred embodiment, the receptacle housing 91 may be constructed from a molded plastic.

An O-ring seal 116 is disposed in a peripheral groove 109 defined in an outer surface 104 of the connector section 96 of the receptacle housing 91. The pump end section 97 of the receptacle housing 91 has an outer surface 95 that defines a peripheral groove 94 which holds an O-ring gland 93. The O-ring gland 93 and the grounding tab 92 become effective once installed into a cord entry port 73 of the pump's motor housing 62. Disposed within the receptacle housing 91 are the electrical contact pins 110. The contact pins 110 are oriented parallel to a center axis of the receptacle housing 91 and are electrically isolated from one another. Each contact pin 110 has a first exposed end portion 111 adjacent the connector end section 96 of the receptacle housing 91 and a second exposed end portion 112 adjacent the pump end section 97 of the receptacle housing 91.

As shown in FIGS. 6A and 7A, the receptacle assembly 90 attaches to the pump 60 by way of the entry port 73 in the motor housing 62. The receptacle assembly 90 provides the unimpeded transmission of electrical power and/or electrical signals through the motor housing 62 while simultaneously electrically grounding the housing as will be described further on, and preventing pumpage ingressions and turbine oil wicking. The entry port 73 may be cylindrical in shape and should be free of burrs and other defects. The receptacle housing 91 typically has a shape that corresponds to that of the entry port 73. Thus, in the case of a cylindrical shape entry port 73 as stated above, the receptacle housing 91 may also be cylindrical in shape with the O-ring gland 93 sealingly interfacing with the entry port 73 upon installation, to prevent pumpage infiltrations around the receptacle housing 91. Because of the simplicity of this type of installation, wire-twisting difficulties found on conventional cord entries can be overcome. For example, a conventional cord entry receptacle having wire pigtails assembled via threading into a pump's motor housing, would twist and possibly damage the wires or their connections due to the multiple rotations during assembly.

Referring again to FIGS. 7A and 7B, the pump end section 97 of the receptacle housing 91 is preferably located within the motor chamber 64 and includes a shoulder or stop 98. An internally threaded jam nut 99 is threaded over a threaded outer surface section 100 of the receptacle housing 91. The stop 98 and the jam nut 99 retain the pump end section 97 of the receptacle housing 91 in the entry port 73.

Still referring to FIGS. 7A and 7B, the locking arrangement 101 holds and retains the connector assembly 120 to the receptacle assembly 90. The locking arrangement 101 provides a positive seal to prevent pumpage from contacting the electrical contact pins 110. The locking arrangement 101 may be embodied as a twist and lock mechanism including a cam groove 102 and locking detent 103 defined on the outer surface 104 of the connector end section 96 of the receptacle housing 91, below the O-ring 116, and an associated coupling ring 123 rotatively affixed to an outer surface 122 of a connector body 121 of the connector assembly 120.

The electrical contact pins 110 disposed within the receptacle housing 91 provide a double line of defense against oil wicking, which is commonly experienced with conventional cord entries. In particular, the contact pins 110 are constructed from solid brass and have a cylindrical, multi-stepped outer surface configuration 113. The contact pins 110 are adapted to meet the electrical energy carrying requirements of the receptacle assembly 90. The contact pins 110 are lightly press-fitted into correspondingly dimensioned multi-stepped holes 105 defined within the receptacle housing 91. The multi-stepped outer surface configuration 113 of the contact pins 110 works much like a labyrinth, to form a liquid tight seal at the holes 105 of the receptacle housing 91. The solid brass construction provides the contact pins 110 with a low surface tension that substantially prevents turbine oil wicking. Thus, when turbine oil wicks up a motor lead wire 114 of the electric motor 65, surface tension is lost at the contact pin 110 and the wicking effect is substantially stopped.

The exposed end portions 111 and 112 of the contact pins 110 are removably insertable into pin barrel electrical connectors 130 located within the connector body 121 of the connector assembly 120, and into pin barrel electrical connectors 115 provided on individual motor lead wires 114 of the electric motor 65 (FIG. 6B). Because the contact pins 110 are electrically isolated from one another it is possible for a single cord entry system 80 to provide multiple functions in a submersible pump. For example, in a preferred embodiment of the cord entry system 80 of the present invention there are three contact pins 110. In another embodiment of the present invention there may be five contact pins 110, the first two contact pins 110 may be dedicated to power transmission, the third one may be dedicated to a ground, while the fourth and fifth contact pins 110 may be dedicated to a seal sensor or some other device. This ability enables a single cord entry system 80 of the present invention to replace multiple cord entries that would normally be required on a typical submersible pump thus, eliminating difficulties associated with producing and maintaining separate cord entries. In another embodiment of the cord entry system 80 of the present invention having three contact pins 110, one contact pin 110 may be used for line power, one for neutral power, and one for grounding.

Figure 7C:
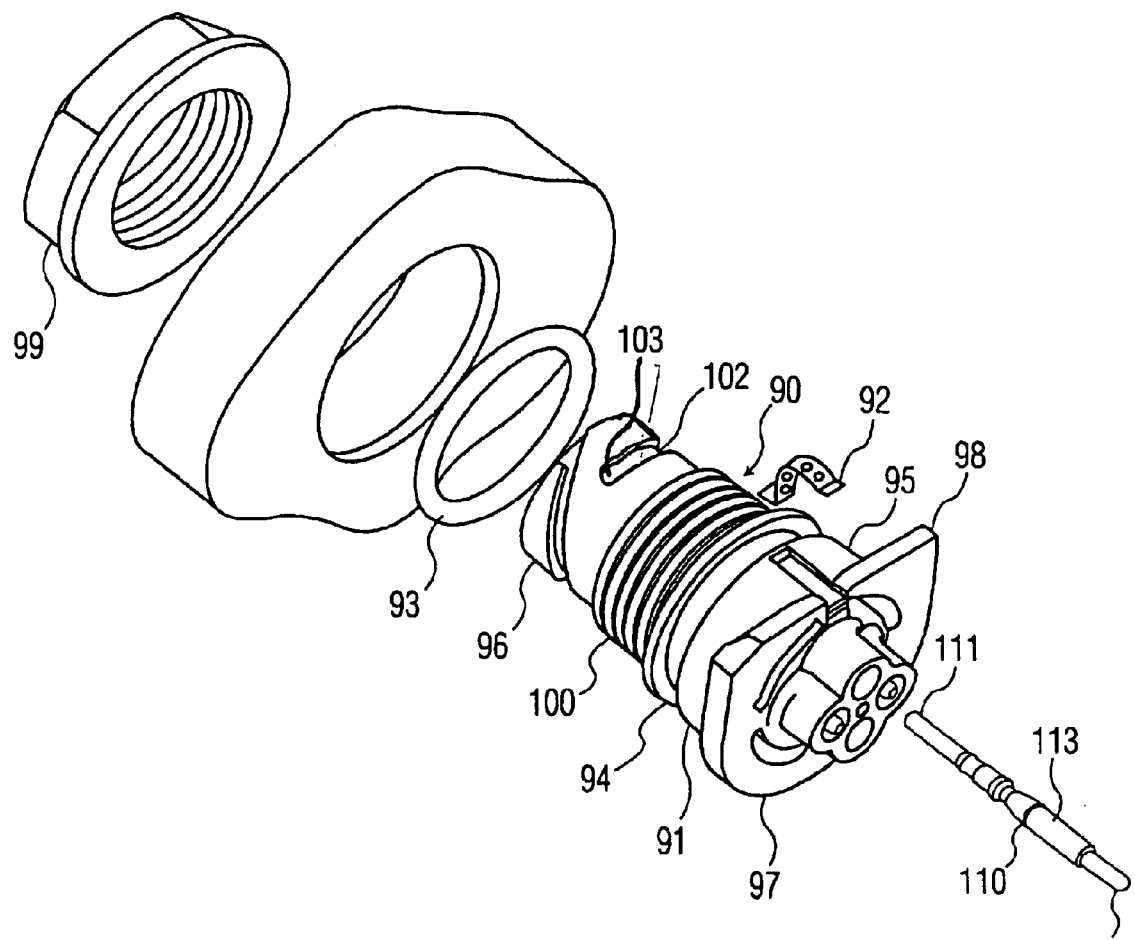
FIG. 7C is an exploded view of the receptacle assembly of the cord entry system shown in FIGS. 6A and 6B.

Electrical grounding of the motor housing 62 may be accomplished by the electrical grounding tab 92 of the receptacle assembly 90. In the embodiment shown in FIGS. 7A–7C, the grounding tab 92 may be constructed as a bent and curved spring-like member 106 that extends through the receptacle housing 91 from a selected one of the electrical contact pins 110 disposed within the receptacle housing 91, to the outer surface 95 of the pump section 97 of the receptacle housing 91 in a manner that creates an electrical contact with the motor housing's entry port 73. A bent interior end 107 of the member 106 is fixedly attached by wedging it between the selected contact pin 110 and the pin's fitted hole 105 within the receptacle housing 91, thus creating electrical contact between the member 106 and the selected contact pin 110. The outwardly curved exterior marginal end portion 108 of the member 106 wedges against an inner surface 74 of the motor housing entry port 73 and the outer surface 95 of the pump section 97 of the receptacle housing 91, below the groove 94 (when the receptacle assembly 90 of the cord entry system 80 is installed into the motor housing 62), thus creating electrical contact between the member 106 and the motor housing entry port 73.

Figure 8A:
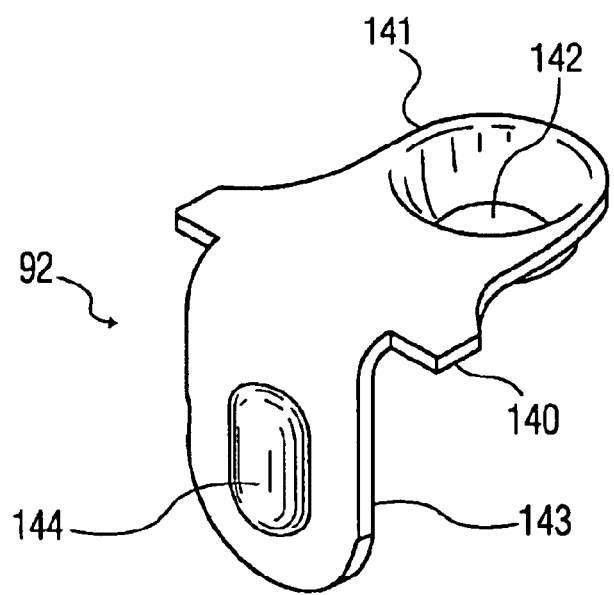
FIGS. 8A and 8B are perspective views of a second embodiment of the grounding tab.
Figure 8B:
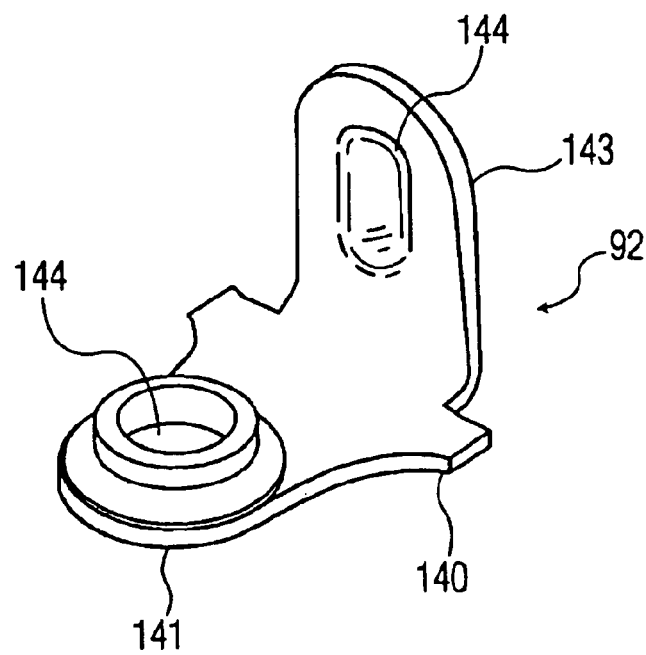
Figure 8C:
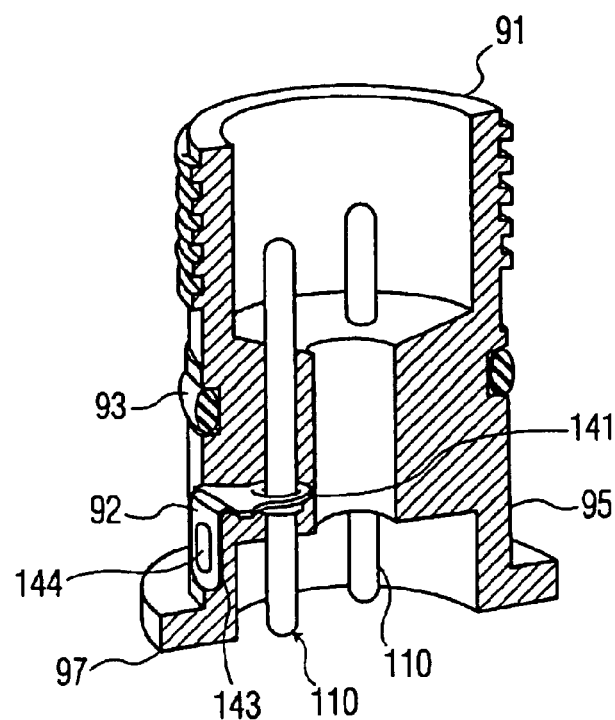
FIGS. 8C and 8D are sectional views of the receptacle housing that illustrate how the grounding tab shown in FIGS. 8A and 8B is used in the receptacle housing of the receptacle assembly.
Figure 8D:
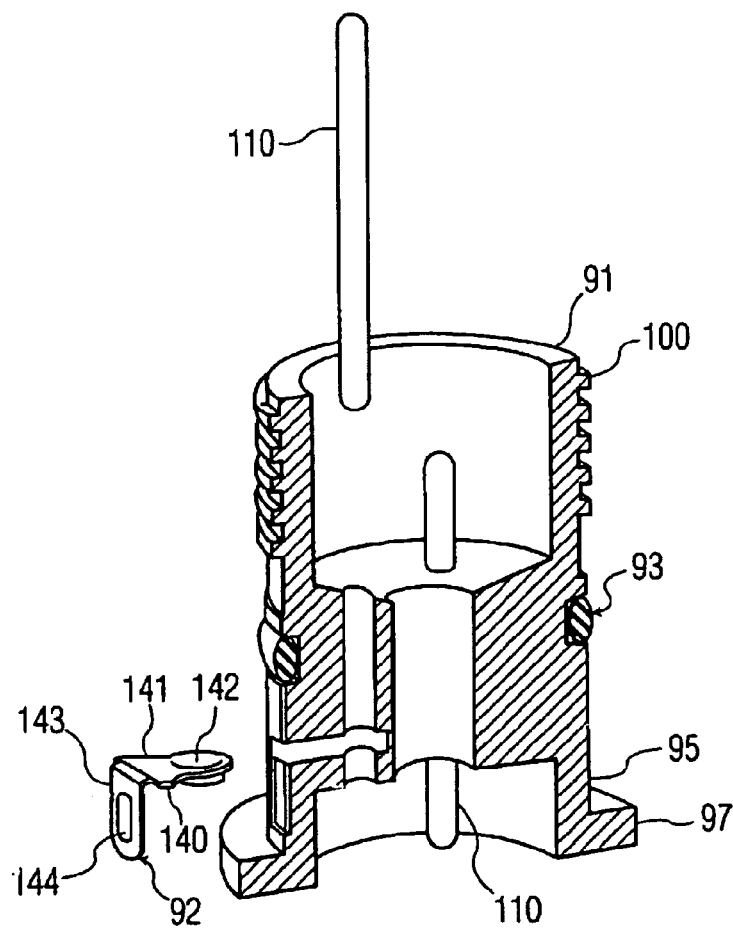

The grounding tab 92 may also be constructed as an L-shape member 140 as shown in FIGS. 8A and 8B. The L-shape member 140 includes a pin contact arm 141 with an aperture 142 and a housing contact arm 143 with a contact bump 144. As shown in FIGS. 8C and 8D, the L-shape member 140 also extends through the receptacle housing 91 from a selected one of the electrical contact pins 110 disposed within the receptacle housing 91, to the outer surface 95 of the pump section 97 of the receptacle housing 91 in a manner that creates an electrical contact with the motor housing's entry port 73 (FIG. 7A). The pin contact arm 141 of the member 140 is fixedly attached to the selected contact pin 110 by pressing the pin 110 through the aperture 142 (a light press-fit), thus creating electrical contact between the member 140 and the selected contact pin 110.

As can be seen by referring collectively to FIGS. 7A, 7B, 8C and 8D, the housing contact arm 143 of the member 140 wedges between the inner surface 74 of the motor housing entry port 73 and the outer surface 95 of the pump section 97 of the receptacle housing 91, below the groove 94 (when the receptacle assembly 90 of the cord entry system 80 is installed into the motor housing 62), such that the contact bump 144 engages the inner surface 74 of the motor housing entry port 73. Accordingly, electrical contact is created between the member 140 and the motor housing entry port 73.

When the receptacle assembly 90 of the cord entry system 80 of the invention is installed into a submersible pump motor housing that is made of a conductive material, the grounding tab 92 integrated into the receptacle assembly 90 of the cord entry system 80 will effectively electrically ground the motor housing without the aid of a separate ground wire and associated difficulties and costs.

Referring again to FIGS. 6A, 7A, and 7B, the connector assembly 120 generally includes the connector body 121 and an electrical cable 126. The cable 126 includes a pump end 127 and an outlet end 128. A NEMA-5P polarized plug 131 configured to interface with a standard residential wall outlet (not shown) is disposed at the outlet end 128 of the cable 126, and a mating connector 129 is disposed at the pump end 127 of the cable 126 used for electrically coupling with the connector end section 96 of the receptacle housing 91. The mating connector 129 includes polarity recognition, the barrel pin connectors 130, and the coupling ring 123. The coupling ring 123 has an inner surface 124 that includes cam followers 125 which ride in the cam grooves 102 and then engage the locking detents of the connector end section 96 of the receptacle housing 91 when coupling ring 123 is rotated to couple the connector assembly 120 to the receptacle assembly 90 during assembly of the connector assembly 120 to the pump 60. The twist and lock locking arrangement 101 combined with the O-ring seal 116 offers a positive liquid seal, as the inner surface 124 of the coupling ring 123 sealingly engages the O-ring seal 116 of the receptacle housing 91. Accordingly, pumpage is substantially prevented from contacting the electrical contact pins 110 of the receptacle assembly 90.

Figure 9A:
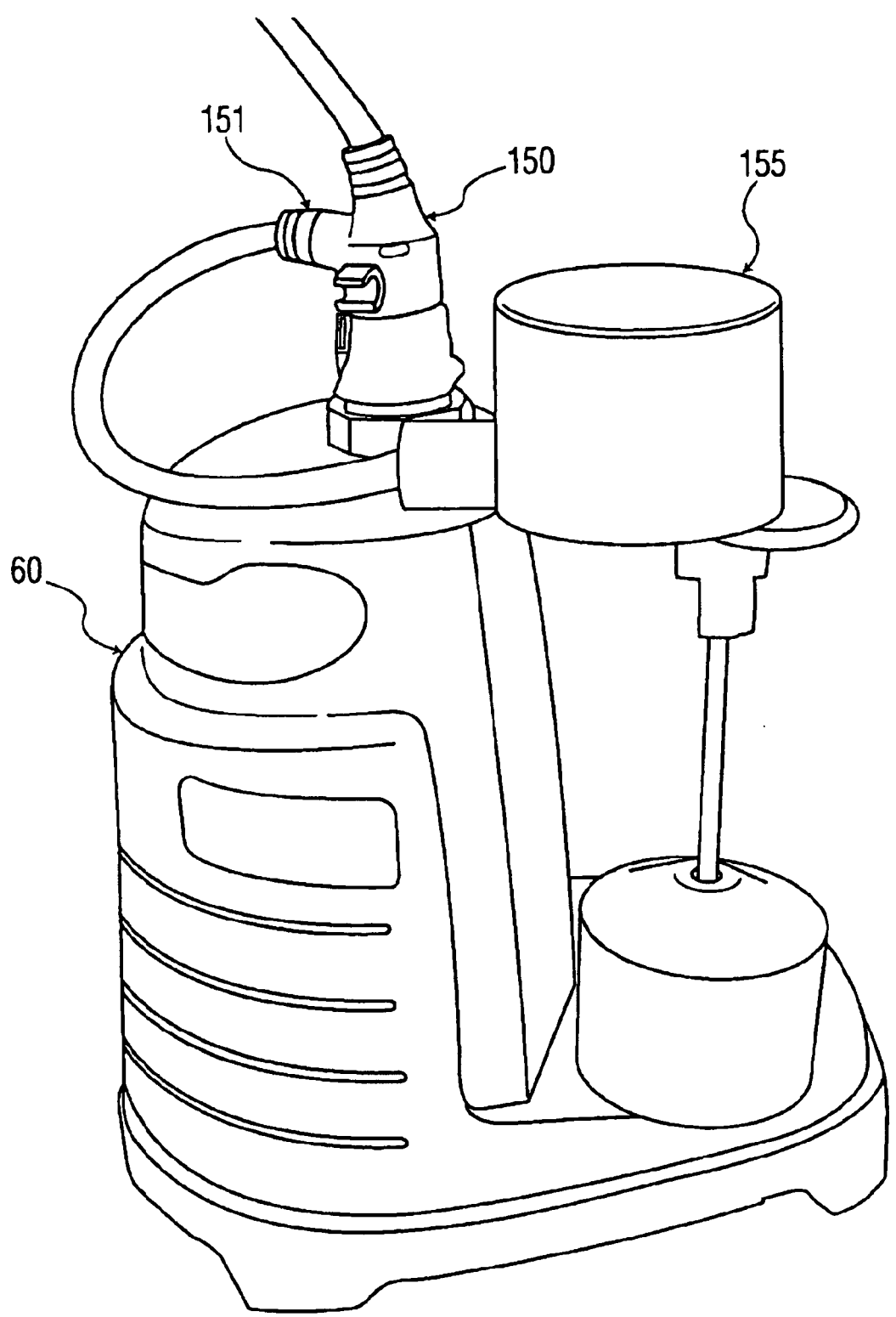
FIG. 9A is a perspective view of an exemplary submersible pump that utilizes a preferred embodiment of the liquid-tight electrical cord entry system of the present invention.
Figure 9B:
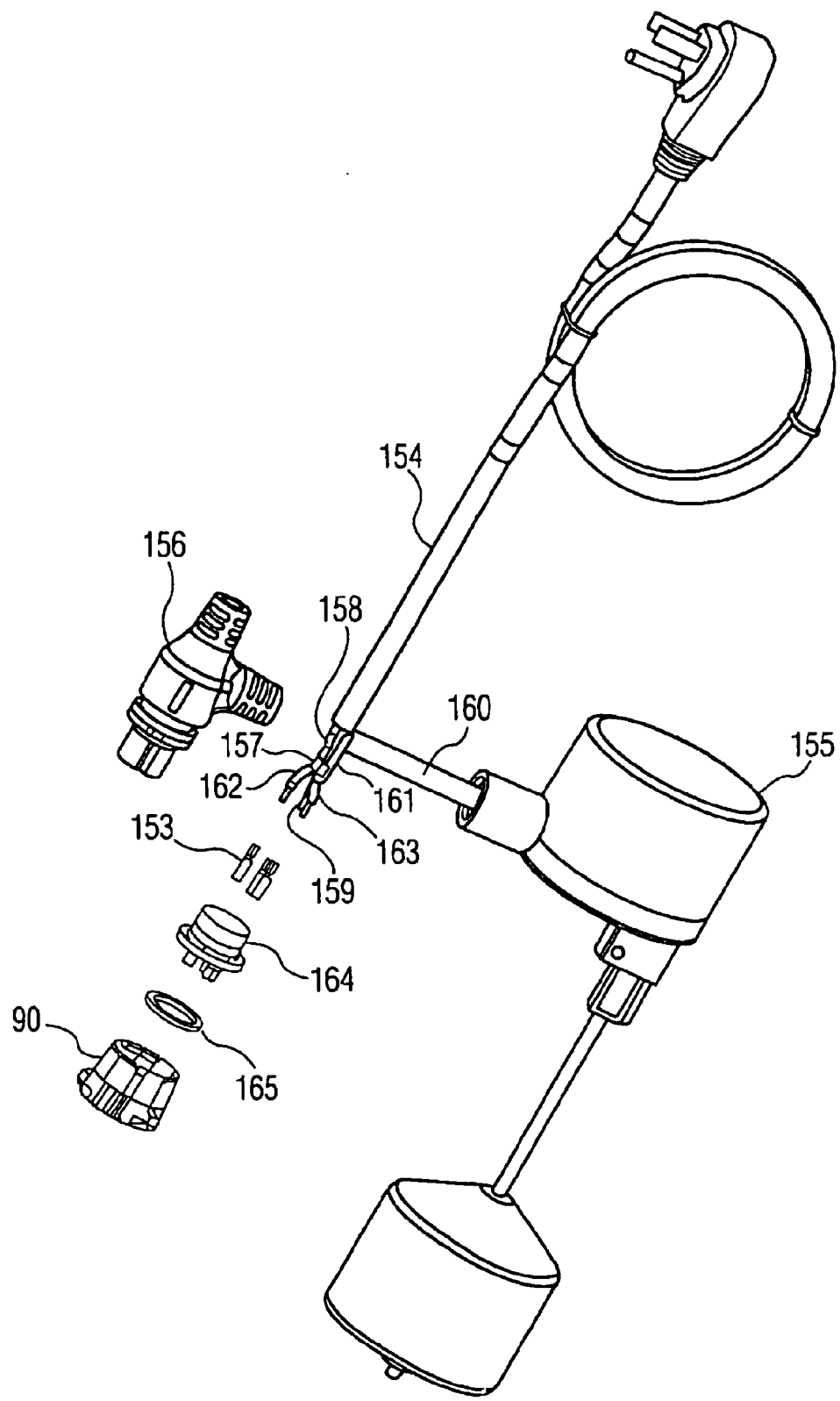
FIG. 9B is an exploded view of the electrical cord entry system of FIG. 9A.
Figure 9C:
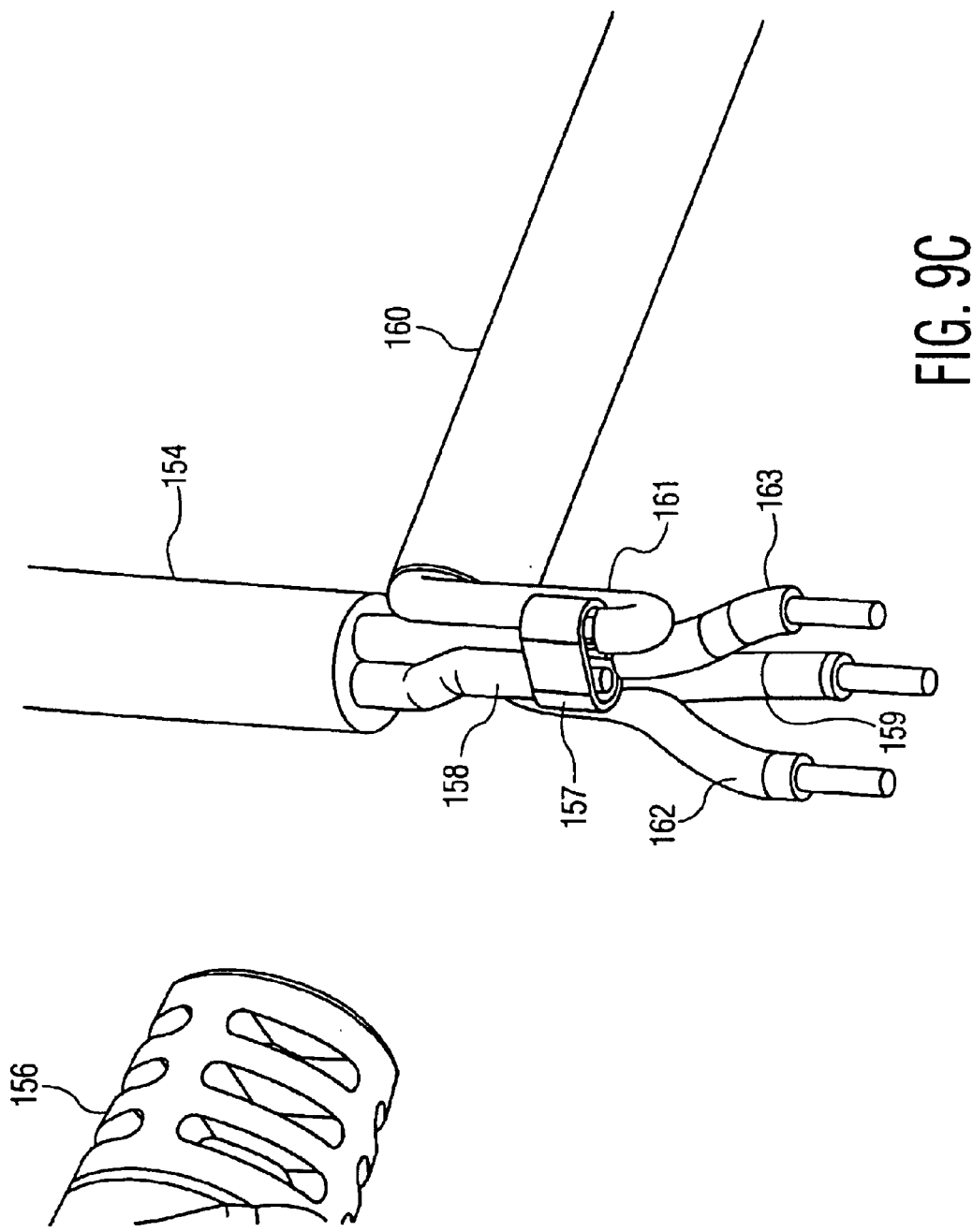
FIG. 9C is an enlarged exploded view of the connector body of the electrical cord entry system of FIG. 9A.

FIGS. 9A–9C collectively show a preferred embodiment of the connector assembly. The connector assembly, denoted by numeral 150 in this embodiment, is substantially identical to the connector assembly of previous embodiment except that it includes a connector body configured as a splicing member 151. The splicing member 151 interfaces with the receptacle assembly 152 and its contact pins 153, and diverts a portion of the electrical power transmitted via primary electrical cable 154 into externally mounted liquid level control device(s) 155 such as a float switch, thus enabling selective operation of the pump 60.

The connector assembly 150 includes an overmolding 156 which forms an outer body of the splicing member 151. The overmolding 156 contains a crimp connector or clip element 157 that couples power transmitted via a first electrical conductor 158 of primary electrical cable 154 to a second electrical conductor 161 of secondary electrical cable 160 which transmits electrical power to the liquid level control device 155. A third electrical conductor 162 of the second electrical cable 160 couples power transmitted through the liquid level control device 155 to an associated contact pin 153 of the receptacle assembly 152. Fourth and fifth electrical conductors 159, 163 of the primary electrical cable 154 are coupled to associated contact pins 153 of the receptacle assembly 152. A carrier element 164 organizes and retains the third, fourth and fifth electrical conductors 162, 159, 163 within the overmolding 156. An annular sealing member 165 of a square cross sectional configuration, seals the receptacle assembly end of the overmolding 156.

The connector assembly 150 of this embodiment alleviates the difficulties associated with conventional cord entries that utilize multiple power cord drops when an externally mounted liquid level control device and/or the like are utilized, e.g., one power cord for the pump motor and one power cord for the level control device. Additionally, the connector assembly 150 of this embodiment eliminates approximately ten feet or more of redundant power cordage and reduces the number of leak-paths associated with conventional cord entry systems.

The cord entry system of the present invention finds particular application in isolated power or data transmission access applications for submersible pumps having electrical components in or near the pumpage. Such applications are normally associated with sump, effluent, or sewage usage in residential homes, farms, municipalities, and light industrial locations. The cord entry system of the present invention may also be suitable for use in other applications as well.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An electrical cord entry system for a submersible pump, the cord entry system comprising:
a receptacle assembly for providing unimpeded transmission of at least one of electrical power and electrical signals through a pump housing of the pump, the receptacle assembly including a ground tab for engaging the pump housing to electrically ground the pump housing.

2. The cord entry system according to claim 1, further comprising a connector assembly for interfacing with the receptacle assembly, the connector assembly supplying the at least one of the electrical power and the electrical signals.

3. The cord entry system according to claim 2, wherein the connector assembly includes a splicing member and a single electrical cable coupled to the splicing member, the splicing member including a first portion that couples to the cable with the receptacle assembly and a second portion that diverts a portion of the electrical power supplied through the cable to a pumpage level control device associated with the pump.

4. The cord entry system according to claim 3, further comprising a locking arrangement that holds and retains the connector assembly to the receptacle assembly.

5. The cord entry system according to claim 4, wherein the locking arrangement includes a cam groove and locking detent associated with the receptacle assembly and a coupling ring associated with the connector assembly.

6. The cord entry system according to claim 1, wherein the receptacle assembly includes a plurality of electrically isolated electrical contacts.

7. The cord entry system according to claim 6, wherein the electrical contacts have a pin structure with a stepped configuration.

8. The cord entry system according to claim 7, wherein the receptacle assembly further includes a receptacle housing having a plurality of holes, the contacts pressed fitted into the holes of the receptacle thereby creating a liquid tight seal.

9. The cord entry system according to claim 6, wherein the contacts are formed of brass.

10. The cord entry system according to claim 6, wherein two of the contacts are for electrical power transmission and another one of the contacts is for electrical grounding via the ground tab.

11. The cord entry system according to claim 10, wherein another two of the contacts are for a device associated with the pump.

12. The cord entry system according to claim 1, wherein the receptacle assembly further includes a receptacle housing having a liquid sealing member that sealingly engages an entry port of the pump housing for preventing pumpage infiltration about the receptacle housing into the pump housing.

13. A submersible pump comprising:

an electric pump motor;

a pump housing for encasing the motor;

an impeller driven by the motor; and an electrical cord entry system including a receptacle assembly for providing unimpeded transmission of at least one of electrical power and electrical signals through the pump housing, the receptacle assembly including a ground tab for engaging the pump housing to electrically ground the pump housing.

14. The pump according to claim 13, wherein the cord entry system further comprises a connector assembly for interfacing with the receptacle assembly, the connector assembly supplying the at least one of the electrical power and the electrical signals.

15. The pump according to claim 14, further comprising a pumpage level control device, wherein the connector assembly includes a splicing member and a single electrical cable coupled to the splicing member, the splicing member including a first portion that couples to the cable with the receptacle assembly and a second portion that diverts a portion of the electrical power supplied through the cable to the level control device.

16. The pump according to claim 15, wherein cord entry system further includes a locking arrangement that holds and retains the connector assembly to the receptacle assembly.

17. The pump according to claim 16, wherein the locking arrangement includes a cain groove and locking detent associated with the receptacle assembly and a coupling ring associated with the connector assembly.

18. The pump according to claim 13, wherein the receptacle assembly includes a plurality of electrically isolated electrical contacts.

19. The pump according to claim 18, wherein the electrical contacts have a pin structure with a stepped configuration.

20. The pump according to claim 19, wherein the receptacle assembly further includes a receptacle housing having a plurality of holes, the contacts pressed fitted into the holes of the receptacle thereby creating a liquid tight seal.

21. The pump according to claim 18, wherein the contacts are formed of brass.

22. The pump according to claim 18, wherein two of the contacts are for electrical power transmission and another one of the contacts is for electrical grounding via the ground tab.

23. The pump according to claim 22, wherein another two of the contacts are for a device associated with the pump.

24. The pump according to claim 13, wherein the receptacle assembly further includes a receptacle housing having a liquid sealing member that sealingly engages an entry port of the pump housing for preventing pumpage infiltration about the receptacle housing into the pump housing.

* * * * *